United States Patent
Lopes

(10) Patent No.: US 11,060,796 B2
(45) Date of Patent: Jul. 13, 2021

(54) 3D SPIRAL HEAT EXCHANGER

(71) Applicant: FLUID HANDLING LLC., Morton Grove, IL (US)

(72) Inventor: Jeffrey D. Lopes, Palatine, IL (US)

(73) Assignee: FLUID HANDLING LLC, Palatine, IL (US)

(*) Notice: Subject to any disclaimer, the term of this patent is extended or adjusted under 35 U.S.C. 154(b) by 0 days.

(21) Appl. No.: 15/618,466

(22) Filed: Jun. 9, 2017

(65) Prior Publication Data

US 2017/0370652 A1 Dec. 28, 2017

Related U.S. Application Data

(60) Provisional application No. 62/347,813, filed on Jun. 9, 2016.

(51) Int. Cl.
| | |
|---|---|
| F28D 9/04 | (2006.01) |
| F28F 3/04 | (2006.01) |
| F28F 3/12 | (2006.01) |
| F28F 1/04 | (2006.01) |
| F28D 7/04 | (2006.01) |
| B33Y 80/00 | (2015.01) |
| F28D 7/02 | (2006.01) |

(52) U.S. Cl.
CPC .............. *F28D 9/04* (2013.01); *F28F 1/04* (2013.01); *B33Y 80/00* (2014.12); *F28D 7/02* (2013.01); *F28D 7/04* (2013.01); *F28F 3/04* (2013.01); *F28F 3/12* (2013.01)

(58) Field of Classification Search
CPC .............. F28D 9/04; F28F 3/04; F28F 3/12
USPC .............................. 165/165, 166
See application file for complete search history.

(56) References Cited

U.S. PATENT DOCUMENTS

| | | | |
|---|---|---|---|
| 2,136,086 A | 11/1938 | Fredrik | |
| 2,251,066 A * | 7/1941 | Persson | F28D 9/0012 165/167 |
| 2,663,549 A | 12/1953 | Otten | |

(Continued)

FOREIGN PATENT DOCUMENTS

| | | |
|---|---|---|
| CN | 1882816 A | 12/2006 |
| CN | 104279895 | 1/2015 |

(Continued)

OTHER PUBLICATIONS

US 5,263,961 A1, 07/2001, Antoine (withdrawn)

(Continued)

*Primary Examiner* — Joel M Attey
(74) *Attorney, Agent, or Firm* — Ware, Fressola, Maguire & Barber LLP

(57) ABSTRACT

A spiral heat exchanger features first spiral channels configured to form rows and columns of coiled hot fluid pathways to receive hot fluid; and second spiral channels configured to form corresponding rows and columns of coiled cold fluid pathways to receive cold fluid having a temperature less than the hot fluid. The first spiral channels and the second spiral channels are configured to alternate every other row and column so as to form a matrix of alternating rows and columns of coiled hot and cold fluid pathways separated by alternating coiled walls that act as both fluid separators and conduits through which heat is transferred between the hot fluid and cold fluid.

17 Claims, 8 Drawing Sheets

An embodiment of the invention showing a 3d spiral heat exchanger.

(56) References Cited

U.S. PATENT DOCUMENTS

| | | | |
|---|---|---|---|
| 3,921,713 A | | 11/1975 | Schnitzer et al. |
| 4,287,724 A | | 9/1981 | Clark |
| 4,301,862 A | | 11/1981 | McCalister |
| 4,445,569 A | * | 5/1984 | Saho .................. F28D 9/0012 165/154 |
| 4,981,171 A | | 1/1991 | Tippmann |
| 5,789,616 A | | 8/1998 | Kobayashi et al. |
| 7,258,081 B2 | | 8/2007 | Burch et al. |
| 7,600,316 B2 | | 10/2009 | Oswald |
| 8,091,618 B2 | | 1/2012 | Doh et al. |
| 8,359,744 B2 | | 1/2013 | Hislop et al. |
| 8,893,319 B2 | * | 11/2014 | Gilbert .................. E03C 1/00 4/598 |
| 9,222,714 B2 | | 12/2015 | Zebuhr et al. |
| 2002/0092646 A1 | | 7/2002 | Kuhn et al. |
| 2009/0294097 A1 | * | 12/2009 | Rini .................. F25B 30/06 165/63 |
| 2012/0175095 A1 | | 7/2012 | Maklouf et al. |
| 2014/0212317 A1 | | 7/2014 | Garry |
| 2014/0262162 A1 | | 9/2014 | Zimmer et al. |
| 2014/0318748 A1 | | 10/2014 | Svensson et al. |
| 2015/0241062 A1 | | 8/2015 | Harding |
| 2016/0116222 A1 | | 4/2016 | Shedd et al. |
| 2016/0230595 A1 | * | 8/2016 | Wong .................. F28F 3/02 |

FOREIGN PATENT DOCUMENTS

| | | |
|---|---|---|
| CN | 104995473 | 10/2015 |
| DE | 3220957 | 12/1983 |
| EP | 0380419 A1 | 8/1990 |
| WO | 199207226 | 4/1992 |
| WO | 2008041910 A1 | 4/2008 |
| WO | 2015067565 A1 | 5/2015 |

OTHER PUBLICATIONS

Website ipfs.io/ipfs/QmXoypizjW3WknFiJnKLw HCnL72vedxjQkDDP1mXWo6uco/wiki/Involute.html.*

English language translation from EPO, Patent Translate, powered by EPO and Google of CN104279895.

"Spiral Plate Heat Exchangers," Elanco, elancoheatexchangers. com, printed Jun. 27, 2016. (3 pages) http://www.elancoheatexchangers.com/spiral-heat-exchangers.html.

"Gooch Thermal: Main Configurations," Gooch Thermal, goochthermal. com, Mar. 6, 2014, printed Jun. 27, 2016. (9 pages) http://web.archive.org/web/20140306074312/http://www.goochthermal.com/spiral-heat-exchanger/configurations/.

"Heat exchanger," WikiPedia, wikipedia.com, printed Jun. 23, 2016. (18 pages) https://en.wikipedia.org/wiki/Heat_exchanger#Spiral_heat_exchangers.

English language Abstract for EP0380419.

English language Abstract of CN1882816A.

English language Abstract of CN104995473A.

English language Abstract and translation of DE3220957.

* cited by examiner

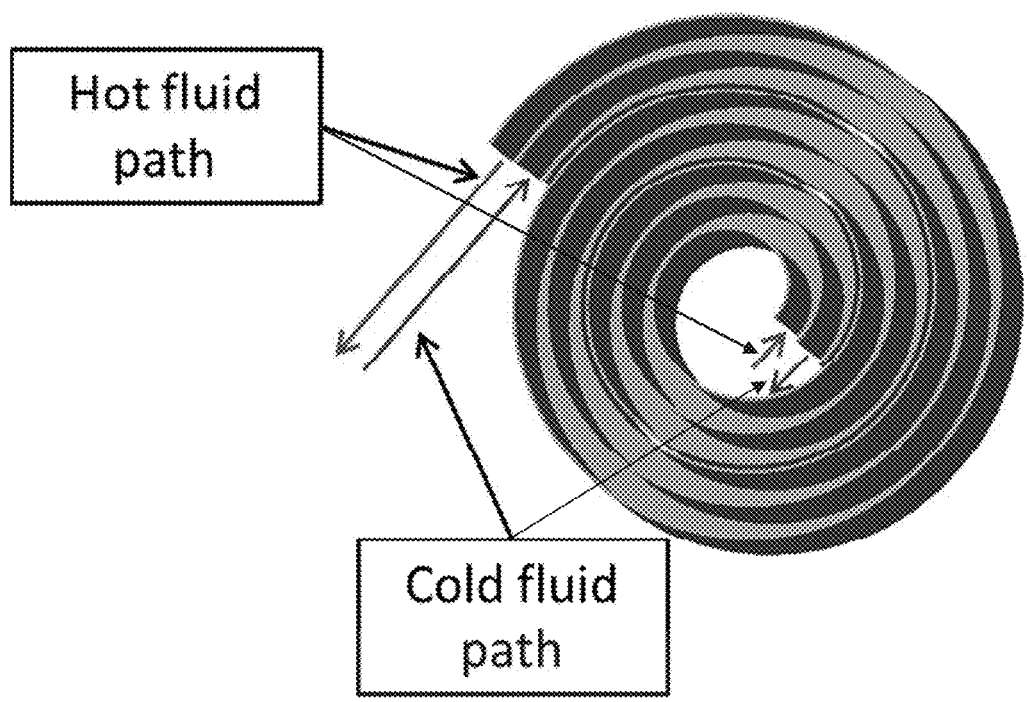
Figure 1 (Prior art): Representation of fluid pathways in a conventional spiral heat exchanger with fluids in counter flow.

Figure 2 (Prior art): A representation of a conventional spiral heat exchanger's swept cross section showing hot fluid and cold fluid channels separated by a wall that acts both as a fluid separator and a conduit through which heat is transferred.

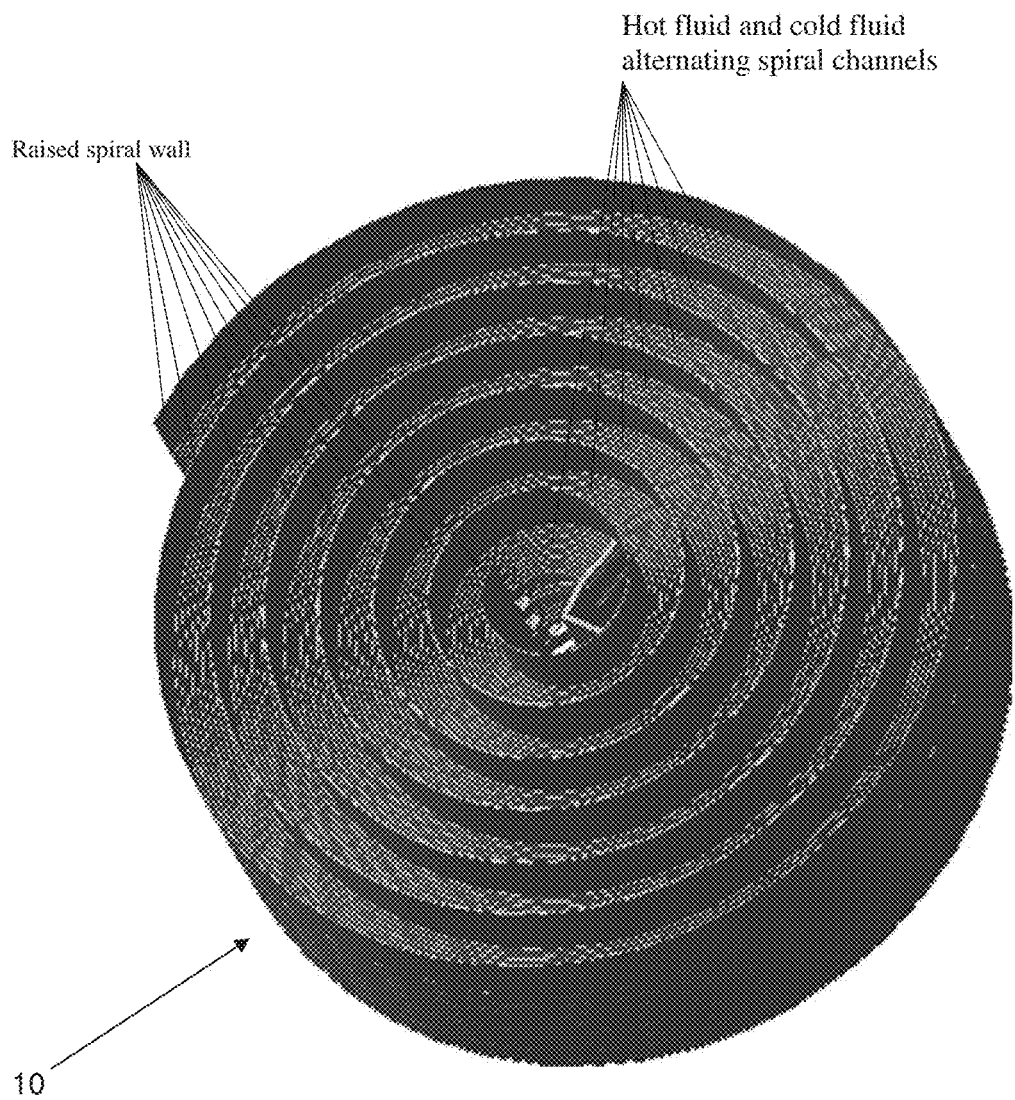
Figure 3: An embodiment of the invention showing a 3d spiral heat exchanger.

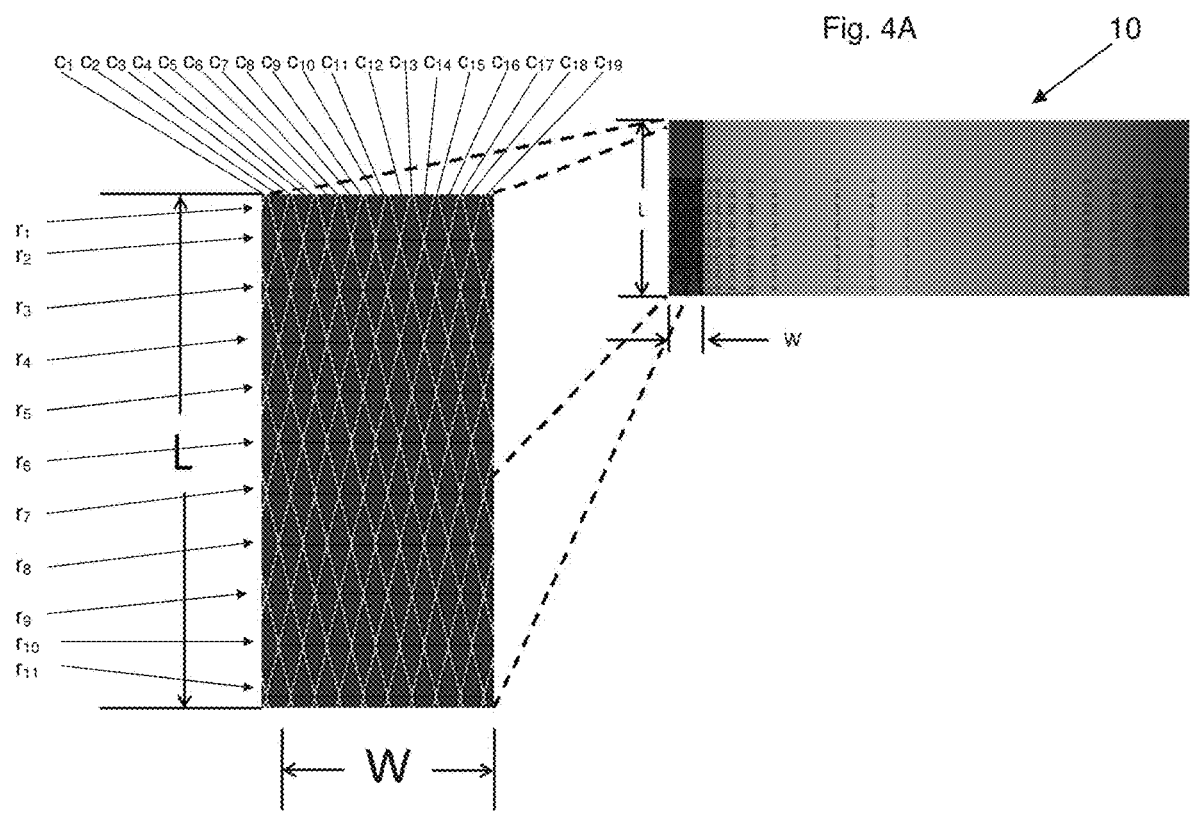
Figure 4: Swept cross sectional view of the 3d spiral heat exchanger showing fluid pathways created in this embodiment.

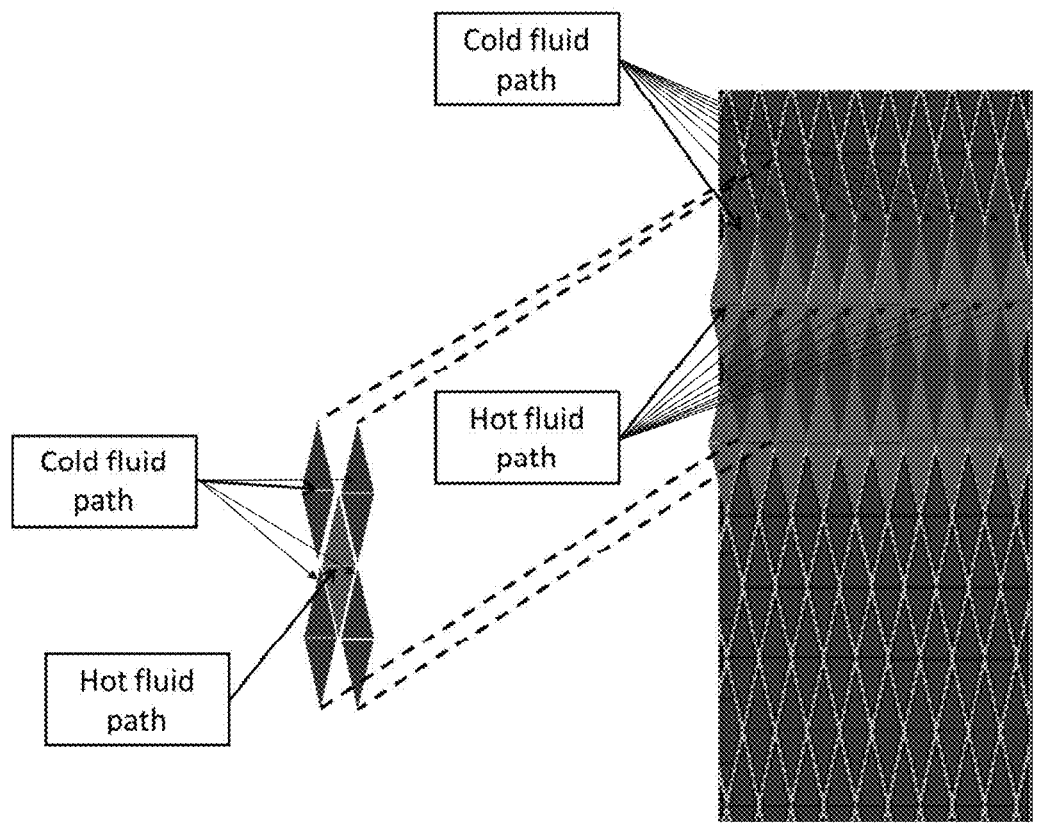
Figure 5: A representation of a fluid pathway arrangement in a 3d spiral heat exchanger showing how alternating rows allow for maximum heat transfer area between two working fluids.

Figure 6: Side-by-side comparison of fluid passages of the exchanger according to the present invention (Fig. 6A) and the known exchanger (Fig. 6B)

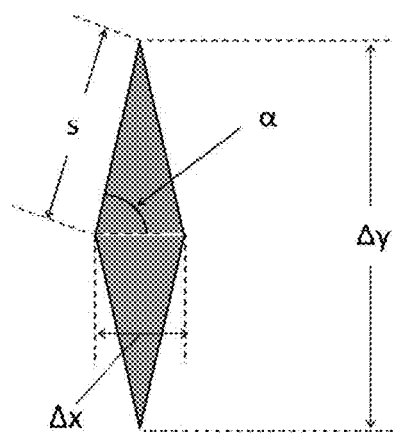 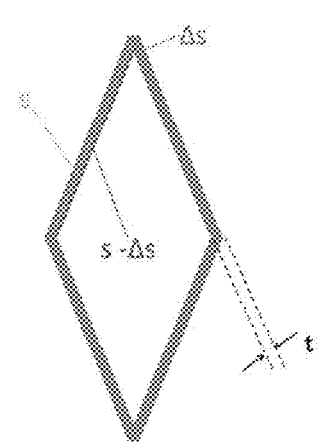
Figure 7: Fluid pathway geometry definitions

Figure 8: Heat Transfer

3D SPIRAL HEAT EXCHANGER

CROSS-REFERENCE TO RELATED APPLICATIONS

This application claims benefit to provisional patent application Ser. No. 62/347,813, filed 9 Jun. 2016; which is incorporated by reference in its entirety.

BACKGROUND OF THE INVENTION

1. Field of Invention

This invention relates to a heat exchanger; and more particularly, to a heat exchanger to lower or raise the temperature of a fluid by facilitating heat transfer between that fluid with another fluid at a different temperature.

2. Description of Related Art

A heat exchanger is a device whose purpose is to lower or raise the temperature of a fluid by facilitating heat transfer between that fluid with another fluid at a different temperature. There are several types of heat exchangers available that vary in heat transfer capability; geometrical design and complexity; cost; working fluid temperature, pressure, and viscosity ranges; and many other attributes.

Common types of heat exchangers include double pipe; shell and tube; and plate and frame. A less common type is the spiral heat exchanger. This heat exchanger is composed of sheet metal coiled in a spiral pattern to form a single channel for hot fluid and a single channel for cold fluid. The hot fluid typically enters at the center of the heat exchanger and flows outward to the periphery of the exchanger and the cold fluid flows in the opposite direction.

This type of heat exchanger has many advantages over the aforementioned types. The spiral channel creates an even velocity distribution throughout the flow path with no dead spots in the flow. This means that, not only will the fluid flow more efficiently, but there is also no particular region that would encourage the deposition of solids or fouling, in fact the design in self-cleaning. Any fouling that occurs will cause a local increase in fluid velocity which will act to clean the fouled area. Due to this the spiral heat exchanger is used with viscous fluids and in situations in which there are particles suspended in the working fluid.

The curvature of the spiral heat exchanger created a secondary flow between the inner and outer portions of the flow path and ensures highly turbulent fluid flow throughout the device even at low Reynolds Numbers. The secondary flow increases mixing which also enhances heat transfer and, due to the constantly changing curvature, the temperature distribution is even throughout the device—There are no hot and cold spots as with other heat exchanger types.

The constantly changing curvature of the spiral heat exchanger also ensures highly turbulent fluid flow throughout the path. This increases mixing which also enhances heat transfer and the due to the constant changing the temperature distribution is even throughout the device—There are no hot and cold spots as with other heat exchanger types which further improves the exchanger's performance.

The spiral heat exchanger provides the highest heat transfer to size ratio of any type that exists today and oversizing the exchanger can result in a lower pressure drop, less required pumping energy, higher thermal efficiency, and lower energy costs compared with other heat exchanger types.

There are also disadvantages to this type of heat exchanger. First, its relatively complex geometry usually results in a higher cost. Second, the large single channels limit the area available for heat transfer and the pressure range for the device.

In view of the aforementioned, there is a need in the industry for a better heat exchanger. e.g., that has a less complex geometry resulting in a lower cost, and also that has small channels that do not limit the area available for heat transfer and the pressure range for the device.

SUMMARY OF THE INVENTION

By way of example, the present invention provides a new and unique spiral heat exchanger featuring:

first spiral channels configured to form rows and columns of coiled hot fluid pathways to receive hot fluid; and second spiral channels configured to form corresponding rows and columns of coiled cold fluid pathways to receive cold fluid having a temperature less than the hot fluid;

the first spiral channels and the second spiral channels being configured to alternate every other row and column so as to form a matrix of alternating rows and columns of coiled hot and cold fluid pathways separated by alternating coiled walls that act as both fluid separators and conduits through which heat is transferred between the hot fluid and cold fluid.

The apparatus may include one or more of the following additional features:

The first spiral channels and the second spiral channels may be configured to form multiple rows and columns of parallel and interlaced fluid pathways.

The first spiral channels and the second spiral channels may be configured to alternate every other row and column so as to form alternating rows and columns of coiled hot and cold fluid pathways having parallelepiped shaped cross-sections separated by upper and lower angled coiled walls.

The first spiral channels and the second of spiral channels may be manufactured using an additive manufacturing process, including using a Powder Bed Fusion technique.

The first spiral channels and the second of spiral channels may be configured so that the alternating rows and columns of coiled hot and cold fluid pathways are coiled parallel to one another The spiral heat exchanger may include a spiral wall separating the first spiral channels and the second of spiral channels.

BRIEF DESCRIPTION OF THE DRAWING

The drawing includes FIGS. 1-7, which are not necessarily drawn to scale, and include the following:

FIG. 1 is a representation of fluid pathways in a conventional spiral heat exchanger with hot and cold fluids in counter flow, e.g., including arrows indicating a hot fluid path having hot fluids flowing in one spiral channel in one flow direction, and including further arrows indicating a cold fluid path having cold fluids flowing in an adjacent spiral channel in an opposite flow direction.

FIG. 2 includes FIGS. 2A and 2B, which are representations of a conventional spiral heat exchanger's swept cross section showing hot fluid and cold fluid channels separated by a channel wall that acts both as a fluid separator and a conduit through which heat is transferred, where FIG. 2A shows a side view of the conventional spiral heat exchanger shown in FIG. 1; and where

FIG. 3 shows a perspective cross sectional view of a computer-aided design rendition of a 3d spiral heat exchanger having hot fluid and cold fluid alternating spiral paths or channels separated by a spiral wall, according to some embodiments of the present invention. (Note: FIG. 3 includes a "raised" spiral wall for the purpose of assisting the reader in differentiating between hot fluid and cold fluid spiraling channel.)

FIG. 4 includes FIGS. 4A and 4B, which is a swept cross sectional view of the 3d spiral heat exchanger showing fluid pathways, according to some embodiments of the present invention, where FIG. 4A shows a side view of the 3D spiral heat exchanger shown in FIG. 3; and where FIG. 4B shows an exploded cross sectional view of part of the 3D spiral heat exchanger shown in FIG. 4A.

FIG. 5 includes FIGS. 5A and 5B, which are a representation of a fluid pathway arrangement in a 3d spiral heat exchanger showing how alternating rows allow for a maximum heat transfer area between two working fluids, according to some embodiments of the present invention, where FIG. 5A shows the exploded cross sectional view of part of the 3D spiral heat exchanger shown in FIG. 4B having hot fluid and cold fluid alternating spiral paths or channels indicated; and where FIG. 5B shows a further exploded view of sub-part of the 3D spiral heat exchanger shown in FIG. 5A having the hot fluid and cold fluid alternating spiral paths or channels indicated.

FIG. 6 includes FIGS. 6A and 6B, which show a side-by-side comparison of fluid passageways, where

FIG. 7 includes FIGS. 7A and 7B, which show fluid pathway geometry definitions, where FIG. 7A shows an illustration of a flow path having geometric definitions for s that is a zero-thickness length of each wall in a passageway, for a that is the angle of the passageway walls relative to a horizontal plane, for $\Delta x$ that is the horizontal length of each passageway, and for $\Delta y$ that is the vertical length of each passageway; and where FIG. 7B shows a further illustration of a flow path having geometric definitions for s that is the zero-thickness length of each wall in the passageway, $\Delta s$ that is the difference between the zero-thickness length of each wall in the passageway and the actual wall length, and t that is the thickness of the internal heat exchanger walls.

FIG. 8 shows a heat transfer equation, e.g., consistent with that set forth on pages 17 thru 35 below.

DETAILED DESCRIPTION OF BEST MODE OF THE INVENTION

Example of an Embodiment

Figure 2B:
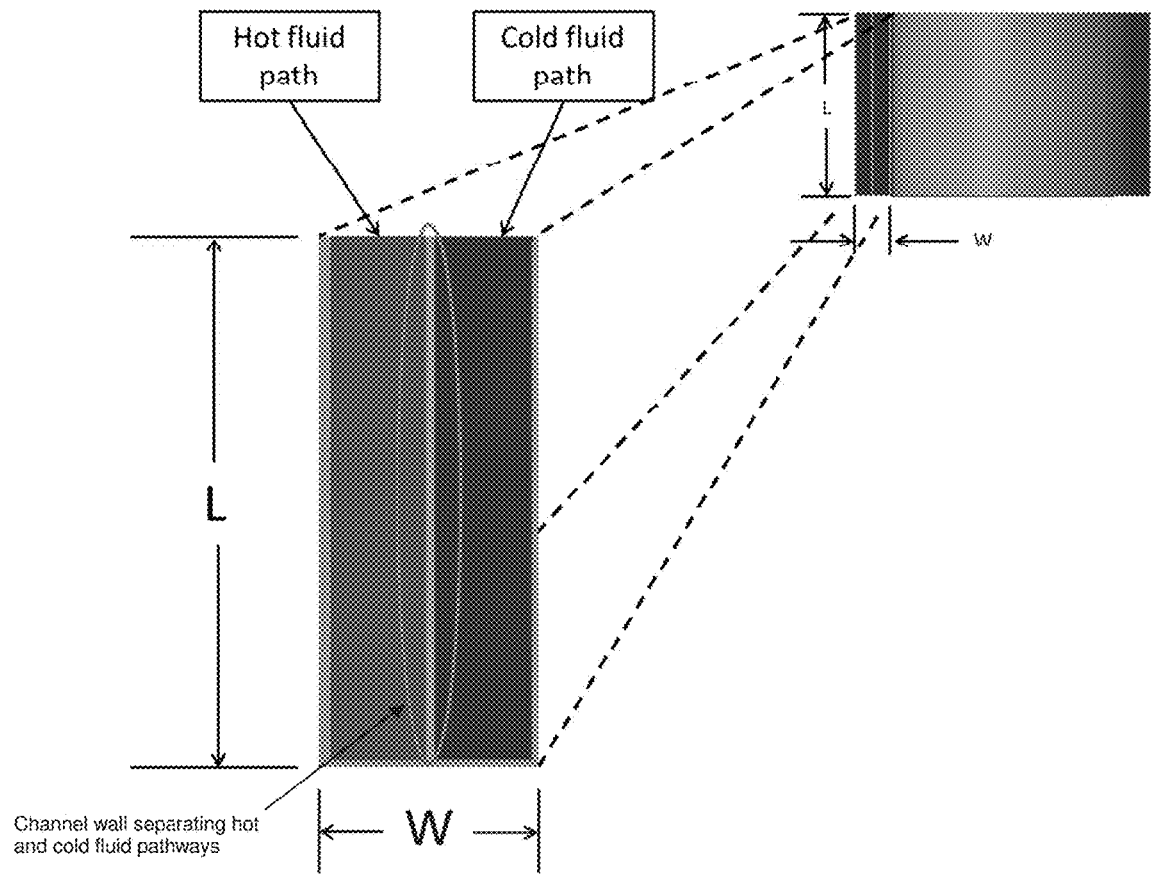
FIG. 2B shows an exploded cross sectional view of part of the conventional spiral heat exchanger shown in FIG. 2A, indicating the channel wall for separating the hot fluid and cold fluid channels, and indicating the length L and the width of the hot fluid and cold fluid channels.
Figures 6A, 6B:
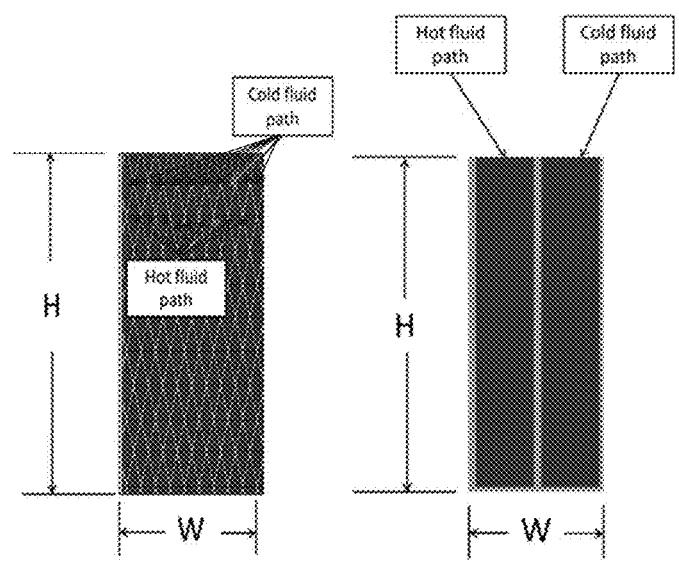
FIG. 6A shows hot fluid and cold fluid alternating spiral paths or channels of the 3D spiral heat exchanger according to some embodiments of the present invention; and where
FIG. 6B shows the hot and cold fluid paths of the conventional spiral heat exchanger.

According to some embodiments, the present invention may take the form of a new and unique 3D spiral heat exchanger generally indicated as 10.

The 3D spiral heat exchanger 10 includes first spiral channels configured to form rows and columns of coiled hot fluid pathways to receive hot fluid. For hot fluid flowing from the outer/peripheral portion to the inner/central portion of the 3D spiral heat exchange 10, the hot fluid paths or channels are shown and designated in FIG. 4B as rows and columns, as follows:

$r_2, c_1; r_4, c_1; r_6, c_1; r_8, c_1; r_{10}, c_1;$
$r_2, c_3; r_4, c_3; r_6, c_3; r_8, c_3; r_{10}, c_3;$
$r_2, c_5; r_4, c_5; r_6, c_5; r_8, c_5; r_{10}, c_5;$
. . . ;
$r_2, c_{17}; r_4, c_{17}; r_6, c_{17}; r_8, c_{17}; r_{10}, c_{17};$ and
$r_2, c_{19}; r_4, c_{19}; r_6, c_{19}; r_8, c_{19}; r_{10}, c_{19}.$ The 3D spiral heat exchanger 10 includes second spiral channels configured to form corresponding rows and columns of coiled cold fluid pathways to receive cold fluid having a temperature less than the hot fluid. For cold fluid flowing from the inner/central portion to the outer/peripheral portion of the 3D spiral heat exchange 10, the cold fluid paths or channels are shown and designated in FIG. 4B as rows and columns, as follows:

$r_1, c_{18}; r_3, c_{18}; r_5, c_{18}; r_7, c_{18}; r_9, c_{18}; r_{11}, c_{18};$
$r_1, c_{16}; r_3, c_{16}; r_5, c_{16}; r_7, c_{16}; r_9, c_{16}; r_{11}, c_{16};$
$r_1, c_{14}; r_3, c_{14}; r_5, c_{14}; r_7, c_{14}; r_9, c_{14}; r_{11}, c_{14};$
. . . ;
$r_1, c_4; r_3, c_4; r_5, c_4; r_7, c_4; r_9, c_4; r_{11}, c_4;$ and
$r_1, c_2; r_3, c_2; r_5, c_2; r_7, c_2; r_9, c_2; r_{11}, c_2.$ The first spiral channels and the second spiral channels are configured to alternate every other row and column, e.g., as shown in FIGS. 4 and 5, so as to form a matrix of alternating rows and columns of coiled hot and cold fluid pathways separated by alternating coiled walls that act as both fluid separators and conduits through which heat is transferred between the hot fluid and cold fluid, e.g., flowing in opposite directions.

By way of example, the first and second spiral channels may be configured to form multiple rows and columns of parallel and interlaced fluid pathways, e.g., as shown in FIGS. 4-5. For instance, the first and second spiral channels may be configured to alternate every other row and column so as to form alternating rows and columns of coiled hot and cold fluid pathways, e.g., having parallelepiped shaped cross-sections separated by upper and lower angled coiled walls. For instance, the parallelepiped shaped cross-sections may be configured as two isosceles triangles having a common base, or as a rhombus-like structure. However, the scope of the invention is not intended to be limited to the pathways having any particular geometric shape. For example, the scope of the invention is intended to include, and embodiments are envisioned in which, the alternating rows and columns of coiled hot and cold fluid pathways have other types or kinds of geometric shapes either now known or later developed in the future, e.g., including multi-surfaced geometric shapes like a square, a hexagon, a heptagon, an octagon, etc.

DETAILED DISCUSSION

In effect, the present invention provides a spiral heat exchanger that has multiple parallel fluid pathways. The design greatly increases the heat transfer area available to the exchanger, while at the same time increasing the strength of the design so that it can handle higher pressures. The design is deemed to be very complex and can currently be produced using additive manufacturing, although the scope of the invention is not intended to be limited to any particular type or kind of manufacturing process used, e.g., that is either now known or later developed in the future.

Consistent with that set forth above, FIG. 1 shows a conventional spiral heat exchanger flow path design, having a path that consists of two rectangular channels that are swept along an Archimedean spiral defined by the equation:

$$r=a+b\theta,$$

where a and b are constants that define the tightness and width of the spiral and r and $\theta$ are polar coordinates in a coordinate system that is coplanar with the bottom face of the heat exchanger and whose origin lies at its geometrical center. The curvature can also be created using the involute of a circle, e.g., using the following equation:

$$r=a\sqrt{1+\theta^2}.$$

These paths or channels are separated by a metal sheet through which heat from the hotter fluid is transferred to the colder fluid, which are flowing in opposite directions as shown. FIG. 2 shows the swept cross section of a conventional spiral heat exchanger. Spiral heat exchanger designs are currently limited to either this arrangement or a helical shaped pipe arrangement which is sometimes called a helical coil heat exchanger.

For this type of heat exchanger known in the art, the total available area for heat exchange to occur is limited to the surface area of the metal sheet separating the two fluids. The present invention assumes the same overall external shape of a conventional spiral heat exchanger, however breaks up the inner hot and cold fluid channels into several smaller pathways which, according to one embodiment of the present invention, have parallelepiped shaped cross sections, although the hot and cold fluid channels do not necessarily have to take this specific shape. By way of example, FIG. 3 shows a view of the entire 3D spiral heat exchanger, and FIG. 4 shows a swept cross sectional view showing the pathways inside the 3D spiral heat exchanger.

Note that in FIG. 3 there is a spiral wall that extends above the top of the heat exchanger, which is shown for the purpose of highlighting the overall curvature along which the cross section is swept for illustrative purposes only. In the actual embodiment, the spiral wall is substantially the same height as the hot and cold fluid channels. The hot and cold fluid pathways are arranged such that they are alternated every row and column. This configuration allows for every pathway to be surrounded by fluid of the opposite temperature flowing in the opposite direction. By virtue of the design and arrangement of these alternating pathways, the area available for heat transfer between the two fluids is greatly increased relative to the conventional spiral heat exchanger known in the art, which, in turn, will increase the heat transfer rate between the two fluids. FIG. 5 shows diagrams of the alternating pathways having cold fluid pathways and hot fluid pathways. In FIG. 5B, the hot fluid path indicated by the arrow is completely surrounded on all four sides by the four surrounding cold fluid paths indicated by the arrows. This same structural heat transfer relationship exists for all inner/intermediate hot fluid paths and inner cold fluid paths, e.g., between columns rows $r_2$ thru $r_{10}$, and columns $c_2$ thru $c_{18}$. Consistent with that shown, for example, in FIG. 4B some of the outer/peripheral hot and cold fluid paths are surrounded on less than all four sides. By way of example, see and compare outer hot and cold fluid paths extending along rows $r_1$ and $r_{11}$, and columns $c_1$ and $c_{19}$.

In general, the exact increase in heat transfer area will be dependent on the particular geometry of the pathways and the thickness of the internal walls. The pathways also form a support structure and will allow the 3d spiral heat exchanger to handle higher pressures than the conventional spiral heat exchanger known in the art. By way of example, FIG. 7 shows an example of the geometry of an individual pathway and the parameters that define its shape. In order to fully define the rhomboidal version only L, W $\alpha$, t, and $\Delta y$ are required to fully define the swept cross section.

In particular, the exact increase in heat transfer area will be dependent on the particular geometry (e.g. on the size) of the pathways, the thickness of the metal, and the ratio of the pathway's height to its width. Assuming a so-called zero metal thickness, the relative increase in heat transfer area between a conventional spiral heat exchanger known in the art and the present invention may by characterized by the equation:

$$A_R = \frac{2N}{\sin(\alpha)},$$

Where:
$A_R$=Relative area ratio;
N=The number of pathways in a given channel width;
$\alpha$=The angle formed by the side of the pathway and the horizontal plane (see FIG. 7).

By way of example, for a design in which N=10 and $\alpha$=22.5°, there may be about 50 times more available heat transfer surface using the present invention compared to the conventional spiral heat exchanger, e.g., like that shown in FIGS. 1-2.

It is also possible to determine the relative area while accounting for the thickness of the walls and for all non-zero wall thicknesses the area available for fluid flow will decrease this must be taken into account when designing the present invention for a particular situation.

The pathways also form a support structure and will allow the 3d spiral heat exchanger to handle higher pressures than the conventional spiral heat exchanger.

Due to the highly complex nature of the geometry of the pathways that form the present invention such a design may be constructed with, or by using, additive manufacturing processes, although embodiment are envisioned using other metalworking processes that are either now known or later developed in the future. By way of example, the additive manufacturing process may include, or take the form of, a Powder Bed Fusion technique, which appears to be the most appropriate currently available method to construct the design, although not necessarily the only additive manufacturing process that could construct the present invention.

By way of example, in the Powder Bed Fusion process, a part is built up layer by layer in a bed of metal powder using a laser whose path, intensity, speed, and several other parameters are determined by a computer program that uses a solid 3d model of the part to calculate their appropriate values. The additive manufacturing construction of the 3d spiral heat exchanger would begin on a build plate upon which the first layer or "slice" of the heat exchanger would be formed. The forming of this slice would occur as a result of the melting and subsequent fusion of a thin layer of metal powder which had been laid atop the build plate onto the build plate as the laser is swept through the areas determined by a computer program to contain solid geometry in the first slice of the 3d model.

Upon completion of the first slice of the heat exchanger, the build plate would be lowered, another layer of powder would be placed above the part and a second layer which corresponds to a second slice of the part would be formed in the same manner as the first slice only this time fusing to the previously built layer instead of the build plate. This process would continue until the entire solid geometry of the part was built.

Although some design constraints from the Powder Bed Fusion process exist and must be taken account for making embodiments of the present invention, using this process complex internal passageways can be built which would otherwise be extremely difficult or impossible to build using other metalworking processes. For example, the part could not be cast due to the internal passageways and could not be milled due to the spiral curvature of those passageways. It is possible to imagine layers of corrugated plates with spiral corrugation patterns being welded together but this would involve a lot of layers of welds, would produce uneven passageways, and would be susceptible to cross contamination of the two fluids due to the number of welds that would be required.

Below, and by way of further example, an analysis is set forth to understand how this type of heat exchanger may perform relative to a conventional spiral heat exchanger. The following assumptions and simplifications were made:

The spiral curvature is defined by an Archimedean Spiral to simplify the math but it could also be described by a circle involute:

Archimedean Spiral: $r = a + b\theta$

Circle Involute: $r = a\sqrt{1+\theta^2}$

The size (envelope) of the additive and conventional heat exchangers was held constant.

The flow rate through both heat exchangers was held constant.

The change in Dean Number across the swept cross section was ignored, and the radius of curvature was considered equal in the two heat exchangers.

The fluid properties are constant between the exchangers.

Input/Output Manifolds

The 3D spiral heat exchanger disclosed herein may be configured with, or coupled to, input/output manifolds for providing hot fluid to corresponding hot fluid paths or channels.

By way of example, the hot fluid input manifold may be configured on the outer/peripheral portion of the 3D spiral heat exchanger to provide the hot fluid to the corresponding hot fluid paths or channels designated in FIG. 4B as $r_2, c_1; r_4, c_1; r_6, c_1; r_8, c_1; r_{10}, c_1;$
$r_2, c_3; r_4, c_3; r_6, c_3; r_8, c_3; r_{10}, c_3;$
$r_2, c_5; r_4, c_5; r_6, c_5; r_8, c_5; r_{10}, c_5;$
. . . ;
$r_2, c_{19}; r_4, c_{19}; r_6, c_{19}; r_8, c_{19}; r_{10}, c_{19},$ for flowing and spiraling inwardly, until the hot fluid reaches the hot fluid output manifold configured in the inner/center portion of the 3D spiral heat exchanger.

In contrast, and by way of further example, the cold fluid input manifold may be configured in the inner/center portion of the 3D spiral heat exchanger to provide the cold fluid to corresponding cold fluid paths or channels designated in FIG. 4B as $r_1, c_{18}; r_3, c_{18}; r_5, c_{18}; r_7, c_{18}; r_9, c_{18}; r_{11}, c_{18};$
$r_1, c_{16}; r_3, c_{16}; r_5, c_{16}; r_7, c_{16}; r_9, c_{16}; r_{11}, c_{16};$
$r_1, c_{14}; r_3, c_{14}; r_5, c_{14}; r_7, c_{14}; r_9, c_{14}; r_{11}, c_{14};$
. . . ;
$r_1, c_2; r_3, c_2; r_5, c_2; r_7, c_2; r_9, c_2; r_{11}, c_2,$ for flowing and spiraling outwardly, until the cold fluid reaches the cold fluid output manifold on the outside/peripheral portion of the 3D spiral heat exchanger.

The scope of the invention is not intended to be limited to any particular type or kind of input/output manifolds for providing/receiving hot fluid or cold fluid to/from corresponding hot fluid and cold fluid alternating paths or channels.

The scope of the invention is also not intended to be limited to the hot fluid or the cold fluid flowing in any particular direction, e.g., inwardly or outwardly. For example, embodiments are envisioned, and the scope of the invention is intended to include, the hot fluid being provided to the inner/center portion of the 3D spiral heat exchanger for flowing outwardly, and the cold fluid being provided to the outer/peripheral portion of the 3D spiral heat exchanger and flowing inwardly.

Additive Manufacturing Process

As one skilled in the art would appreciate, an additive manufacturing refers to a process by which digital 3D design data is used to build up a component in layers by depositing material. The term "3D printing" is increasingly used as a synonym for additive manufacturing.

Possible Applications

The present invention may be used in almost any situation in which it is desirable to change the temperature of a fluid. By way of example, possible applications may include one or more of the following: aerospace, viscous fluid processing, corrosive chemical processing, high temperature applications.

Notation Used

By way of example, the patent application may include some or all of the following notation:
a Value that determines the width of the cross section swept by the spiral
$A_{ht}$ Area available for heat transfer in the heat exchanger
$A_{flow}$ Area available for fluid flow in the heat exchanger
b Value that determines the curvature of the spiral
$D_h$ Hydraulic Diameter
dl Differential length associated with the spiral
h Convection coefficient
H Height of the cross section swept by the spiral
$k_f$ Thermal conductivity of the working fluid
$k_{mat}$ Thermal conductivity of the heat exchanger material
$L_{ht}$ Length available for heat transfer in the cross section
$L_{spiral}$ Length of the spiral which defines the heat exchanger
N The number of pathways
P The perimeter of each pathway
r The radius used to define the spiral curvature in polar coordinates.
R The radius of curvature of the spiral
t The thickness of the internal heat exchanger walls
$\Delta T$ The temperature difference between the hot and cold fluids
s The zero-thickness length of each wall in a passageway
$\Delta s$ The difference between the zero thickness wall length and the actual wall length
v Fluid velocity
$\dot{V}$ Fluid volume flow rate
W The width of the swept cross section
$\Delta x$ The horizontal length of each passageway Δy The vertical length of each passageway
α The angle of the passageway walls relative to the horizontal plane
θ The angle used to define the spiral in a polar coordinate system
μ Fluid dynamic viscosity
ρ Fluid density
φ Angle between fluid velocity and flow area
De Dean Number
Nu Nusselt Number
Pr Prandlt Number
Re Reynolds Number Examples of Analytical Results By way of example, the following is an example of analytical results:
Relative Heat Transfer Area
The ratio of the surface area available for heat transfer in the additive design relative to the conventional design $$A_{ht,R} = \frac{A_{ht,3d}}{A_{ht,2d}} = \frac{W\tan(\alpha)}{\Delta y^2}\left(\frac{\Delta y}{2\sin(\alpha)} - \frac{t}{\cot(\alpha)}\right)$$

Relative Fluid Velocity
The ratio of the average fluid velocity in the additive design relative to the conventional design:

$$|\bar{v}_R| = \frac{|\bar{v}_{3d}|}{|\bar{v}_{2d}|} = \frac{\Delta y^2}{\tan(\alpha)\sin(2\alpha)\left(\frac{\Delta y}{2\sin\alpha} - \frac{t}{\cot(\alpha)}\right)^2}$$

Relative Heat Transfer
The estimated ratio of the heat transfer capability of the additive design relative to the conventional design:

$$HT_R = \frac{\left(\frac{W\tan(\alpha)}{\Delta y^2}\left(\frac{\Delta y}{2\sin(\alpha)} - \frac{t}{\cot(\alpha)}\right)\right)\left(2 + \frac{t_{2d}}{k_m}\right)}{\frac{2^{0.25}(2H + W - t_{2d})^{0.25}\left(\frac{\Delta y}{2\sin\alpha} - \frac{t}{\cot(\alpha)}\right)^{1.25}\sin(2\alpha)^{0.75}}{H^{0.25}(W - 2t_{2d})^{0.25}\sqrt{\frac{\Delta y^2}{\tan(\alpha)}}} + \frac{t}{k_m}}$$

Additive Heat Exchanger Volume
The volume of material that the additive heat exchanger will be composed of:

$$\mathbb{V} = \frac{bWH}{2}\left(1 - \frac{\tan(\alpha)\sin(2\alpha)}{\Delta y^2}\left(\frac{\Delta y}{2\sin(\alpha)} - \frac{t}{\cot(\alpha)}\right)^2\right)$$
$$\left(\theta_f\sqrt{1+\theta_f^2} - \theta_i\sqrt{1+\theta_i^2} + \sinh^{-1}(\theta_f) - \sinh^{-1}(\theta_i)\right)$$

Heat Transfer Area:

$$A_{ht,3d} = \frac{4WHL_{spiral}\tan(\alpha)}{\Delta y^2}\left(\frac{\Delta y}{2\sin\alpha} - \frac{t}{\cot(\alpha)}\right)$$

Fluid Velocity:

$$|\bar{v}_{3d}| = \frac{\Delta y^2 \dot{V}}{WH\tan(\alpha)\sin(2\alpha)\left(\frac{\Delta y}{2\sin\alpha} - \frac{t}{\cot(\alpha)}\right)^2}$$

Figure 8:
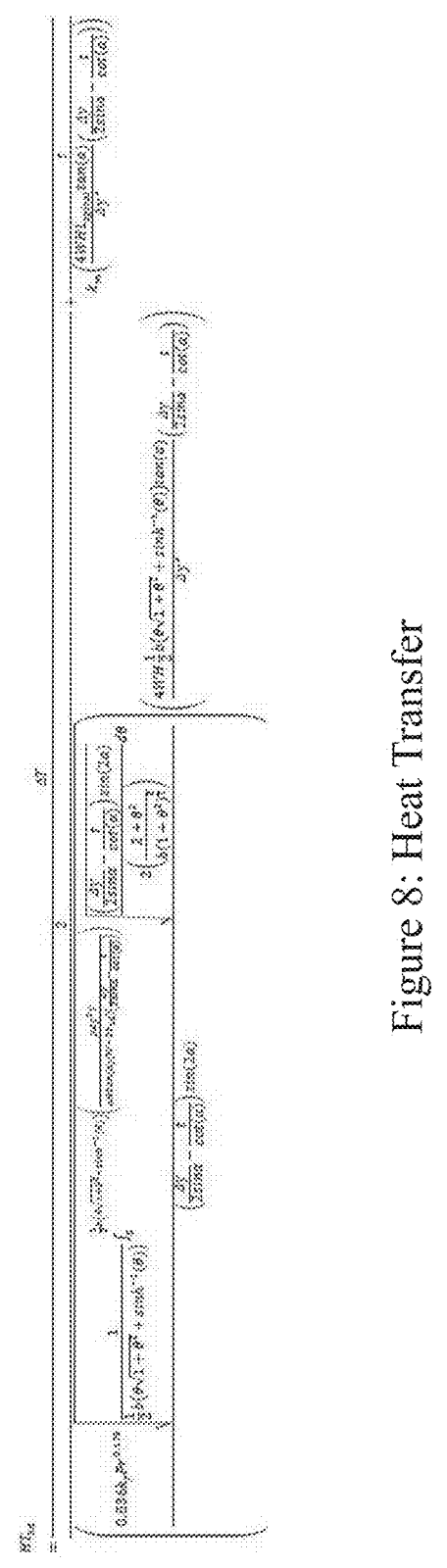

Heat Transfer:
See the equation in FIG. 8

Derivation of Equations

The is an example of a derivation of equations:
The total available area for heat transfer in the exchanger can be determined by finding the total length in the cross section and multiplying by the length swept by the spiral.

$$A_{ht} = L_{Spiral}L_{ht|Cross\ section}$$

For a conventional spiral heat exchanger the area available for heat transfer in the cross section is the 2 sides of the wall separating the hot and cold fluids. For an internal sweep it is four times the height of the wall.

$$A_{ht,2d} = L_{Spiral}(4H)$$

For the 3d spiral heat exchanger the cross sectional length available for heat transfer is the sum of the internal perimeters of each passageway.

$$A_{ht,3d} = NPL_{spiral}$$
$$P = 4(s - \Delta s) = 4\left(\frac{\Delta y}{2\sin\alpha} - \frac{t}{\cot(\alpha)}\right)$$
$$N = \frac{WH}{\Delta x \Delta y}$$

Considering that $$\Delta x = \frac{\Delta y}{\tan\alpha}$$
$$A_{ht,3d} = \frac{4WHL_{spiral}\tan(\alpha)}{\Delta y^2}\left(\frac{\Delta y}{2\sin\alpha} - \frac{t}{\cot(\alpha)}\right)$$

The ratio of the heat transfer area in the 3d spiral to the 2d spiral is then:

$$A_{ht,R} = \frac{A_{ht,3d}}{A_{ht,2d}} = \frac{W\tan(\alpha)}{\Delta y^2}\left(\frac{\Delta y}{2\sin(\alpha)} - \frac{t}{\cot(\alpha)}\right)$$

The thickness of the passageways will affect the velocity of the fluid. The calculations for the fluid velocity are performed assuming that the flow rate is held constant between the 3d and 2d spiral heat exchangers.
The area available for fluid flow in the 2d spiral is:

$$A_{flow,2d} = H(W - 2t_{2d})$$

The area available for fluid flow in the 3d spiral is the sum of the areas of each of the rhombus shaped passageways.

$$A_{flow,3d} = N(s - \Delta s)^2 \sin(2\alpha) = \frac{WH}{\Delta y^2}\tan(\alpha)\sin(2\alpha)\left(\frac{\Delta y}{2\sin\alpha} - \frac{t}{\cot(\alpha)}\right)^2$$

The ratio of the flow areas is:

$$A_{flow,R} = \frac{A_{flow,3d}}{A_{flow,2d}} = \frac{W}{\Delta y^2 (W - 2t_{2d})} \tan(\alpha)\sin(2\alpha)\left(\frac{\Delta y}{2\sin\alpha} - \frac{t}{\cot(\alpha)}\right)^2$$

With the flow rate held constant the average velocity can be found.

$$\dot{V}_{2d} = \dot{V}_{3d} = \dot{V}$$

$$|\bar{v}_{3d}||A_{flow,3d}|\cos(\varphi) = |\bar{v}_{2d}||A_{flow,2d}|\cos(\varphi)$$

Since the tangent angle is determined by the overall spiral curvature which is assumed to be the same in both heat exchangers the above can be expressed as:

$$|\bar{v}_{3d}| = \frac{|A_{flow,2d}|}{|A_{flow,3d}|}|\bar{v}_{2d}|$$

Substituting in the areas and using:

$$|\bar{v}_{2d}| = \frac{\dot{V}_{2d}}{|A_{flow,2d}|} = \frac{\dot{V}}{H(W - 2t_{2d})}$$

$$|\bar{v}_{3d}| = \frac{\Delta y^2 \dot{V}}{WH\tan(\alpha)\sin(2\alpha)\left(\frac{\Delta y}{2\sin\alpha} - \frac{t}{\cot(\alpha)}\right)^2}$$

The ratio of the velocities of the 3d and 2d exchangers is:

$$|\bar{v}_R| = \frac{|\bar{v}_{3d}|}{|\bar{v}_{2d}|} = \frac{\Delta y^2 (W - 2t_{2d})}{W\tan(\alpha)\sin(2\alpha)\left(\frac{\Delta y}{2\sin\alpha} - \frac{t}{\cot(\alpha)}\right)^2}$$

The heat transfer is found by calculating the Nusselt Number using the equation:

$$Nu = \frac{hD_h}{k_f} = 0.836 Pr^{0.175}\sqrt{De}$$

Where the Dean number is averaged along the length of the spiral $$De = Re\sqrt{\frac{D_h}{2R}}$$

$$\overline{De} = \frac{1}{L}\int_0^L Re\sqrt{\frac{D_h}{2R}}\, d\hat{l}$$

The hydraulic diameter is calculated using:

$$D_h = \frac{4A_{flow}}{P}$$

For the 3d and 2d cross sections:

$$D_{h,3d} = \frac{4\sin(2\alpha)\left(\frac{\Delta y}{2\sin\alpha} - \frac{t}{\cot(\alpha)}\right)^2}{4\left(\frac{\Delta y}{2\sin\alpha} - \frac{t}{\cot(\alpha)}\right)} = \left(\frac{\Delta y}{2\sin\alpha} - \frac{t}{\cot(\alpha)}\right)\sin(2\alpha)$$

$$D_{h,2d} = \frac{4H(W - 2t_{2d})}{2(2H + W - t_{2d})} = \frac{2H(W - 2t_{2d})}{(2H + W - t_{2d})}$$

And the Reynolds number is found using:

$$Re = \frac{\rho |\bar{v}| D_h}{\mu}$$

$$Re_{3d} = \frac{\rho |\bar{v}_{3d}| D_{h,3d}}{\mu}$$

$$= \frac{\rho\left(\frac{\Delta y^2 \dot{V}}{WH\tan(\alpha)\sin(2\alpha)\left(\frac{\Delta y}{2\sin\alpha} - \frac{t}{\cot(\alpha)}\right)^2}\right)\left(\left(\frac{\Delta y}{2\sin\alpha} - \frac{t}{\cot(\alpha)}\right)\sin(2\alpha)\right)}{\mu}$$

$$Re_{3d} = \frac{\rho \Delta y^2 \dot{V}}{\mu H \tan(\alpha)(W - 2t_{2d})\left(\frac{\Delta y}{2\sin\alpha} - \frac{t}{\cot(\alpha)}\right)}$$

$$Re_{2d} = \frac{\rho |\bar{v}_{2d}| D_{h,2d}}{\mu} = \frac{\rho\left(\frac{\dot{V}}{H(W - t_{2d})}\right)\left(\frac{2H(W - 2t_{2d})}{(2H + W - t_{2d})}\right)}{\mu} = \frac{2\rho \dot{V}}{\mu(2H + W - t_{2d})}$$

In the end, one is looking for the increase in heat transfer between the 3d and 2d spiral heat exchangers. This will be done by finding the overall heat transfer coefficients and comparing them. In order to do this, one will need to figure out what the ratio of the heat transfer coefficients is, set the 2d one to unity, and solve for the ratio by dividing the heat transfer from the 3d exchanger by the heat transfer from the 2d exchanger.

$$\frac{Nu_{3d}}{Nu_{2d}} = \frac{\frac{h_{3d} D_{h,3d}}{k_f}}{\frac{h_{2d} D_{h,2d}}{k_f}} = \frac{0.836 Pr^{0.175}\sqrt{De_{3d}}}{0.836 Pr^{0.175}\sqrt{De_{3d}}}$$

Assuming equal Prandlt numbers:

$$\frac{h_{3d}}{h_{2d}} = \frac{D_{h,2d}\sqrt{De_{3d}}}{D_{h,3d}\sqrt{De_{2d}}}$$

Setting the 2d convection coefficient to 1 to find the ratio:

$$h_{3d} = \frac{h_{3d}}{1} = \frac{D_{h,2d}\sqrt{De_{3d}}}{D_{h,3d}\sqrt{De_{2d}}} =$$

-continued $$\frac{\left(\frac{2H(W-t)}{((2H+W+t_{2d}))}\right)\sqrt{\left(\frac{1}{L}\int_0^L Re_{3d}\sqrt{\frac{D_{h,3d}}{2R}}\,d\hat{l}\right)}}{\left(\left(\frac{\Delta y}{2\sin\alpha}-\frac{t}{\cot(\alpha)}\right)\sin(2\alpha)\right)\sqrt{\left(\frac{1}{L}\int_0^L Re_{2d}\sqrt{\frac{D_{h,2d}}{2R}}\,d\hat{l}\right)}} \quad 5$$

Since the cross section does not vary along the length of the spiral the hydraulic diameter and Reynolds number can be pulled out of the integral. Substituting in the 2d and 3d Reynolds Numbers:

$$=\frac{\left(\frac{2H(W-t_{2d})}{(2H+W-t_{2d})}\right)\sqrt{\left(\left(\frac{\rho\Delta y^2 \dot{V}}{\mu H\tan(\alpha)(W-2t_{2d})\left(\frac{\Delta y}{2\sin\alpha}-\frac{t}{\cot(\alpha)}\right)}\right)\sqrt{\left(\frac{\Delta y}{2\sin\alpha}-\frac{t}{\cot(\alpha)}\right)\sin(2\alpha)}\int_0^L \sqrt{\frac{1}{R}}\,d\hat{l}\right)}}{\left(\left(\frac{\Delta y}{2\sin\alpha}-\frac{t}{\cot(\alpha)}\right)\sin(2\alpha)\right)\sqrt{\frac{2\rho\dot{V}}{\mu(2H+W-t_{2d})}\sqrt{\frac{2H(W-2t_{2d})}{(2H+W-t_{2d})}}\int_0^L \sqrt{\frac{1}{R}}\,d\hat{l}}}$$

This simplifies to:

$$=\frac{\left(\frac{2H(W-2t_{2d})}{(2H+W-t_{2d})}\right)^{0.75}\sqrt{\left(\left(\frac{\rho\Delta y^2 \dot{V}}{\mu H\tan(\alpha)(W-2t_{2d})\left(\frac{\Delta y}{2\sin\alpha}-\frac{t}{\cot(\alpha)}\right)}\right)\int_0^L \sqrt{\frac{1}{R}}\,d\hat{l}\right)}}{\left(\left(\frac{\Delta y}{2\sin\alpha}-\frac{t}{\cot(\alpha)}\right)\sin(2\alpha)\right)^{0.75}\sqrt{\frac{2\rho\dot{V}}{\mu(2H+W-t_{2d})}\int_0^L \sqrt{\frac{1}{R}}\,d\hat{l}}}$$

The integrals divide out and after further simplifying we finally get:

$$h_{3d} = \frac{2^{0.25}H^{0.25}(W-2t_{2d})^{0.25}\sqrt{\frac{\Delta y^2}{\tan(\alpha)}}}{(2H+W-t_{2d})^{0.25}\left(\frac{\Delta y}{2\sin\alpha}-\frac{t}{\cot(\alpha)}\right)^{1.25}\sin(2\alpha)^{0.75}} \quad 40$$

Using a simple overall heat transfer method the relative heat transfer was then calculated.

$$HT_R = \frac{HT_{3d}}{HT_{2d}} = \frac{\dfrac{\Delta T}{\dfrac{2}{h_{3d}A_{ht,3d}}+\dfrac{t}{k_m A_{ht,3d}}}}{\dfrac{\Delta T}{\dfrac{2}{h_{2d}A_{ht,2d}}+\dfrac{t_{2d}}{k_m A_{ht,2d}}}} = \frac{A_{ht,3d}}{A_{ht,2d}}\frac{\left(2+\dfrac{t_{2d}}{k_m}\right)}{\left(\dfrac{2}{h_{3d}}+\dfrac{t}{k_m}\right)} =$$

$$\frac{W\tan(\alpha)}{\Delta y^2}\left(\frac{\Delta y}{2\sin(\alpha)}-\frac{t}{\cot(\alpha)}\right)\left(\frac{2+\dfrac{t_{2d}}{k_m}}{\dfrac{2}{\dfrac{2^{0.25}H^{0.25}(W-2t_{2d})^{0.25}\sqrt{\dfrac{\Delta y^2}{\tan(\alpha)}}}{(2H+W-t_{2d})^{0.25}\left(\dfrac{\Delta y}{2\sin\alpha}-\dfrac{t}{\cot(\alpha)}\right)^{1.25}\sin(2\alpha)^{0.75}}}+\dfrac{t}{k_m}}\right)$$

$$HT_R = \frac{\left(\dfrac{W\tan(\alpha)}{\Delta y^2}\left(\dfrac{\Delta y}{2\sin(\alpha)}-\dfrac{t}{\cot(\alpha)}\right)\right)\left(2+\dfrac{t_{2d}}{k_m}\right)}{\dfrac{2^{0.25}(2H+W-t_{2d})^{0.25}\left(\dfrac{\Delta y}{2\sin\alpha}-\dfrac{t}{\cot(\alpha)}\right)^{1.25}\sin(2\alpha)^{0.75}}{H^{0.25}(W-2t_{2d})^{0.25}\sqrt{\dfrac{\Delta y^2}{\tan(\alpha)}}}+\dfrac{t}{k_m}}$$

Another useful piece of information is the volume and weight of material of the heat exchanger. The volume is found integrating the area swept by the spiral along the length of the spiral.

$$\forall = \int_{L_{spiral,1}}^{L_{spiral,2}} A_{cs} dl$$

The area of the material cross section is the total cross sectional area minus the area of the passageways:

$$A_{cs} = WH - NA_{flow} = WH\left(1 - \frac{\tan(\alpha)\sin(2\alpha)}{\Delta y^2}\left(\frac{\Delta y}{2\sin(\alpha)} - \frac{t}{\cot(\alpha)}\right)^2\right)$$

The length of the spiral can be expressed as a function of the polar sweep angle $$L_{spiral} = \tfrac{1}{2} b(\theta\sqrt{1+\theta^2} + \sinh^{-1}(\theta))$$

The volume is then:

$$\forall = \int_{\tfrac{1}{2}b\left(\theta_i\sqrt{1+\theta_i^2}+\sinh^{-1}(\theta_i)\right)}^{\tfrac{1}{2}b\left(\theta_f\sqrt{1+\theta_f^2}+\sinh^{-1}(\theta_f)\right)} WH\left(1 - \frac{\tan(\alpha)\sin(2\alpha)}{\Delta y^2}\left(\frac{\Delta y}{2\sin(\alpha)} - \frac{t}{\cot(\alpha)}\right)^2\right) d\theta$$

Where the subscripts i and f denote the angles at which the spiral begins and ends. The final expression is for the volume is shown below:

$$\forall = \frac{bWH}{2}\left(1 - \frac{\tan(\alpha)\sin(2\alpha)}{\Delta y^2}\left(\frac{\Delta y}{2\sin(\alpha)} - \frac{t}{\cot(\alpha)}\right)^2\right)\left(\theta_f\sqrt{1+\theta_f^2} - \theta_i\sqrt{1+\theta_i^2} + \sinh^{-1}(\theta_f) - \sinh^{-1}(\theta_i)\right)$$

And the total weight is found by multiplying the volume by the density of the material used to construct the spiral.

weight=$\rho\forall$

General Analysis

The intent of the comparative analysis was to allow a direct comparison between a traditional design and an additive design with the same curvature and cross sectional area therefore everything was based on the geometry of the conventional and additive designs. A general analysis was performed in order to estimate the performance of the new design on its own using fluid and thermal properties.

The radius of curvature is defined by the Archimedes' Spiral along which the cross section is swept. The radius of curvature for an Archimedes' spiral is:

$$R(\theta) = \frac{2 + \theta^2}{b(1 + \theta^2)^{\tfrac{3}{2}}}$$

And the differential length is:

$$d\hat{l} = \frac{\dot{r}\hat{a}_r + \theta\hat{a}_\theta}{\sqrt{\dot{r}^2 + \theta^2}} = \frac{b}{\sqrt{b^2 + 1}}\hat{a}_r + \frac{1}{\sqrt{b^2 + 1}}\hat{a}_\theta$$

Different Nusselt Number correlations have been found for a spiral geometry.
They are usually in the form of:

$$Nu = C_1 Pr^{C_2} De^{C_3}$$

Matlab Code

By way of example, the following is MATLAB code which may be used to design the 3D spiral heat exchanger, according to some embodiments of the present invention
% Program to aid in the development of the AM Spiral Heat Exchanger
% All fluid properties from test of prototype 1 at 5 l/s flow rates clear all;

```
%HX Material parameters
Kmat = 16.2;                              %Thermal Conductivity of metal - Titanium W/mK
rhomat = 4605;                            %Density of build material - Titanium, Renishaw
costmat = 600;                            %Cost of the material - $/kg - Titanium Al
%Geometry
%Spiral parameters
b= 0.144;                                 %Curvature parameter in inches
thetai = 8.0;                             %Starting angle in radians
thetaf = 21.4;                            %Ending angle in radians
%Set up vectors that hold data to be plotted
calcsize        =         round((thetaf-thetai)/0.1);
Uavg            =         zeros(1,calcsize);
UAavg           =         zeros(1,calcsize);
Ltheta          =         zeros(1,calcsize);
Volmet          =         zeros(1,calcsize);
Voltot          =         zeros(1,calcsize);
THETA           =         zeros(1,calcsize);
%Cross section geometry
alpha = 1.158375;           %radians
deltay = 0.2;               %inches
t = 0.03;                   %inches
W = 0.874;                  %inches
H = 1.63;                   %inches
%convert to metric
deltay = deltay*0.0254;                   %meters
t = t*0.0254;                             %meters
W = W*0.0254;                             %meters
H = H*0.0254;                             %meters
b = b*0.0254;                             %meters
```

```
%Fluid Properties
Kfluidh = 0.58;                              %Thermal Conductivity of hot water W/mK
Kfluidc = 0.58;                              %Thermal Conductivity of cold water W/mK
Cph = 4182;                                  %J/kgK
Cpc = 4178;                                  %J/kgK
rhoh = 988;                                  %kg/m^3
rhoc = 994.1;                                %kg/m^3
muh = 0.547*10^-3;                           %Dynamic viscosity (Nsec/m^2)
muc = 0.7255*10^-3;                          %Dynamic viscosity, cold fluid using avg f/test 50C
                                             (Nsec/m^2)
Prh = Cph*muh/Kfluidh;                       %Prandlt hot
Prc = Cpc*muc/Kfluidc;                       %Prandlt cold
mdoth = 0.083;                               %kg/sec
mdotc = 0.083;                               %kg/sec
%Vary the length of the spiral and see how it affects the overall HT Coefficient
i=1;
for thetao = thetai +.1: 0.1: thetaf %radians
    %Geometry Calculations
    N = round((W*H*tan(alpha))/(deltay^2));              %Number of passages
    P = 4*((deltay)/(2*sin(alpha))-t/(tan(pi/2-alpha))); %Perimeter of passageway
    Lspiral = 0.5*b*((thetao*(1+thetao^2)^0.5+asinh(thetao)) −
    (thetai*(1+thetai^2)^0.5+asinh(thetai)));            %Spiral Length
    Aht = N*P*Lspiral;                                   %Heat Transfer Area in in^2
    Aflow = W*H*(1/(deltay^2))*tan(alpha)*sin(2*alpha)*(0.5*deltay/sin(alpha)-t/tan(pi/2-
    alpha))^2;                                           %Cross Sectional Flow Area in^2
    Dhyd = 4*Aflow/(P*N);                                %Hydraulic Diameter of passages in m^2
    %Flow Calculations
    Vdoth = mdoth/rhoh;                                  %Volume flow rate of hot fluid, m^3/sec
    Vdotc = mdotc/rhoc;                                  %Volume flow rate of cold fluid, m^3/sec
    velh = Vdoth/Aflow;                                  %Velocity of hot fluid, m/sec
    velc = Vdotc/Aflow;                                  %Velocity of cold fluid, m/sec
    Reh = rhoh*velh*Dhyd/muh;                            %Reynolds number for hot fluid
    Rec = rhoc*velc*Dhyd/muc;                            %Reynolds cold
    %Calculate the average Dean Numbers
    syms theta
    R =(2+theta^2)/(b*(1+theta^2)^(3/2));
    X = 05*b*(theta*(1+theta^2)^.5+asinh(theta));
    dLdtheta = diff(X,theta);
    Zh=Reh*(Dhyd^.5)*(2^-0.5)*((R^0.5)*dLdtheta);
    Zc=Rec*(Dhyd^.5)*(2^-0.5)*((R^0.5)*dLdtheta);
    Gh=int(Zh,theta,thetai,thetao);
    Gc=int(Zc,theta,thetai,thetao);
    Deanh=((1/Lspiral)*vpa(Gh,5))^0.5;
    Deanc=((1/Lspiral)*vpa(Gc,5))^0.5;
    Nuh = double((Prh^0.175)*(0.65*(Deanh^0.5)+.76));
    Nuc = double((Prc^0.175)*(0.65*(Deanc^0.5)+.76));
    hconvh = Nuh*Kfluidh/Dhyd;
    hconvc = Nuc*Kfluidc/Dhyd;
    U = 1/(1/hconvh+1/hconvc+t/Kmat);
    UA = U*Aht;
    Uavg(i) = U;
    UAavg(i) = UA;
    Ltheta(i) = Lspiral;
    THETA(i) = thetao;
    Volmet(i) = (H*W-Aflow)*Lspiral;
    Voltot(i) = H*W*Lspiral;
    i=i+1;
end
CostHXmin      =      costmat*rhomat*Volmet;
CostHXmax      =      costmat*rhomat*Voltot;
figure
plot(Ltheta,Uavg)
xlabel('Length of Spiral in meters')
ylabel('Overall Heat Transfer Coefficient - W/(m^2K)')
title('Length of the Spiral Heat Exchanger vs. Average Overall Heat Transfer Coefficient')
figure
plot(Ltheta,UAavg)
xlabel('Length of Spiral in meters')
ylabel('UA Value (W/K)')
title('Length of the Spiral vs UA Value')
figure
hold on
plot(Ltheta,CostHXmin)
plot(Ltheta,CostHXmax)
xlabel('Length of Spiral in meters')
ylabel('Cost of material USD')
title('Cost of the HX – Material Only – Titanium')
legend('minimum','maximum')
```

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A spiral heat exchanger comprising:
a spiral wall having a spiral curvature so as to form a spiral pathway; and
a matrix arranged in the spiral pathway of the spiral wall, the matrix having alternating hot and cold spiral fluid channels being formed by
    first spiral channels configured to form rows and columns of coiled hot fluid pathways to receive a hot fluid, and
    second spiral channels configured to form corresponding rows and columns of coiled cold fluid pathways to receive a cold fluid having a temperature less than the hot fluid;
the first spiral channels and the second spiral channels being configured to alternate every other row and column of the first spiral channels and the second spiral channels so as to form alternating rows and columns of coiled hot and cold fluid pathways separated by alternating coiled walls that act as both fluid separators and conduits through which heat is transferred between the hot fluid and cold fluid.

2. A spiral heat exchanger according to claim 1, wherein the first spiral channels and the second spiral channels are configured to form multiple rows and columns of parallel and interlaced fluid pathways.

3. A spiral heat exchanger according to claim 1, wherein the first spiral channels and the second spiral channels are configured to alternate every other row and column so as to form alternating rows and columns of coiled hot and cold fluid pathways having cross-sections separated by upper and lower angled coiled walls.

4. A spiral heat exchanger according to claim 1, wherein the first spiral channels and the second of spiral channels are manufactured using an additive manufacturing process so as to make a 3D spiral heat exchanger.

5. A spiral heat exchanger according to claim 4, wherein the additive manufacturing process includes using a Powder Bed Fusion additive manufacturing process.

6. A spiral heat exchanger according to claim 1, wherein the first spiral channels and the second spiral channels are configured so that the alternating rows and columns of coiled hot and cold fluid pathways are coiled parallel to one another.

7. A spiral heat exchanger according to claim 1, wherein the spiral curvature is swept along an Archimedean spiral defined by the following equation:

$$r = a + b\theta,$$

where a and b are constants that define the tightness and width of the spiral, and r and θ are polar coordinates in a coordinate system that is coplanar with a bottom face of the spiral heat exchanger and whose origin lies at its geometrical center.

8. A spiral heat exchanger according to claim 1, wherein the spiral curvature is defined using an involute of a circle, having the following equation:

$$r = a\sqrt{1+\theta^2},$$

where a is constants that define the tightness of the spiral and width, and r and θ are polar coordinates in a coordinate system that is coplanar with a bottom face of the spiral heat exchanger and whose origin lies at its geometrical center.

9. A spiral heat exchanger according to claim 1, wherein the spiral wall is substantially the same height as the alternating hot and cold spiral fluid channels arranged therein.

10. A 3-dimensional spiral heat exchanger comprising:
a spiral wall having a spiral curvature so as to form a spiral pathway; and
a matrix arranged in the spiral pathway of the spiral wall, the matrix having alternating hot and cold spiral channels formed by
    first spiral channels configured to form rows and columns of coiled hot fluid pathways to receive a hot fluid, and
    second spiral channels configured to form corresponding rows and columns of coiled cold fluid pathways to receive a cold fluid having a temperature less than the hot fluid;
the first spiral channels and the second spiral channels being configured to alternate every other row and column of the first spiral channels and the second spiral channels so as to form alternating rows and columns of coiled hot and cold fluid pathways separated by alternating coiled walls that act as both fluid separators and conduits through which heat is transferred between the hot fluid and cold fluid, the first spiral channels and the second of spiral channels being manufactured using an additive manufacturing process so as to make the 3D spiral heat exchanger.

11. A 3-dimensional spiral heat exchanger according to claim 10, wherein the first spiral channels and the second spiral channels are configured to form multiple rows and columns of parallel and interlaced fluid pathways.

12. A 3-dimensional spiral heat exchanger according to claim 10, wherein the first spiral channels and the second spiral channels are configured to alternate every other row and column so as to form alternating rows and columns of coiled hot and cold fluid pathways having cross-sections separated by upper and lower angled coiled walls.

13. A spiral heat exchanger according to claim 10, wherein the additive manufacturing process includes using a Powder Bed Fusion additive manufacturing process.

14. A 3-dimensional spiral heat exchanger according to claim 10, wherein the first spiral channels and the second spiral channels are configured so that the alternating rows and columns of coiled hot and cold fluid pathways are coiled parallel to one another.

15. A 3-dimensional spiral heat exchanger according to claim 10, wherein the spiral curvature is swept along an Archimedean spiral defined by the following equation:

$$r = a + b\theta,$$

where a and b are constants that define the tightness and width of the spiral, and r and θ are polar coordinates in a coordinate system that is coplanar with a bottom face of the spiral heat exchanger and whose origin lies at its geometrical center.

16. A 3-dimensional spiral heat exchanger according to claim 10, wherein the spiral curvature is defined using an involute of a circle, having the following equation:

$$r = a\sqrt{1+\theta^2},$$

where a is constants that define the tightness of the spiral and width, and r and θ are polar coordinates in a coordinate system that is coplanar with a bottom face of the spiral heat exchanger and whose origin lies at its geometrical center.

17. A 3-dimensional spiral heat exchanger according to claim 10, wherein the spiral wall is substantially the same height as the alternating hot and cold spiral fluid channels arranged therein.

* * * * *